United States Patent [19]

Small

[11] Patent Number: 5,752,377
[45] Date of Patent: May 19, 1998

[54] ROLLER TYPE CHAIN ASSEMBLING AND DISASSEMBLING MECHANISM

[75] Inventor: Frank A. Small, Springfield, Mass.

[73] Assignee: Patton Tool Co., Inc., West Springfield, Mass.

[21] Appl. No.: 915,904

[22] Filed: Aug. 21, 1997

[51] Int. Cl.$^6$ .................................................. B21L 21/00
[52] U.S. Cl. .................................................. 59/7; 59/11
[58] Field of Search .................................................. 59/7, 11

[56] References Cited

U.S. PATENT DOCUMENTS

| | | | |
|---|---|---|---|
| 1,710,092 | 4/1929 | Hitchcock | 59/7 |
| 1,994,270 | 3/1935 | Cetrano | 59/7 |
| 2,332,607 | 10/1943 | Schroeder et al. | 59/7 |
| 2,361,971 | 11/1944 | Shipman | 59/7 |
| 2,382,447 | 8/1945 | Schaeufele | 59/7 |
| 2,440,512 | 4/1948 | Jakoubek et al. | 59/7 |
| 3,009,313 | 11/1961 | Wheeler | 59/7 |
| 3,379,005 | 4/1968 | Jones | 59/7 |
| 4,394,810 | 7/1983 | Womble | 59/7 |
| 4,429,525 | 2/1984 | Doak | 59/7 |
| 5,056,305 | 10/1991 | Cole | 59/7 |

*Primary Examiner*—David Jones
*Attorney, Agent, or Firm*—Ross, Ross & Flavin

[57] ABSTRACT

The tool functions as a vise and comprises a ratcheted gear train within a housing, first and second longitudinally-opposed, laterally-spaced upwardly-extending fingers of crooks facing each other, the first crook being fixedly secured to the housing, the second crook being tethered to one extremity of a traveling cable driven longitudinally through its connection to the gear train, the first crook being positionable for bearing engagement against a selected section of the chain, the second crook being positionable for bearing against another selected section of the chain, thereby tensioning the portion of the chain not between the crooks and effectively relaxing the portion of the chain between the crooks.

1 Claim, 3 Drawing Sheets

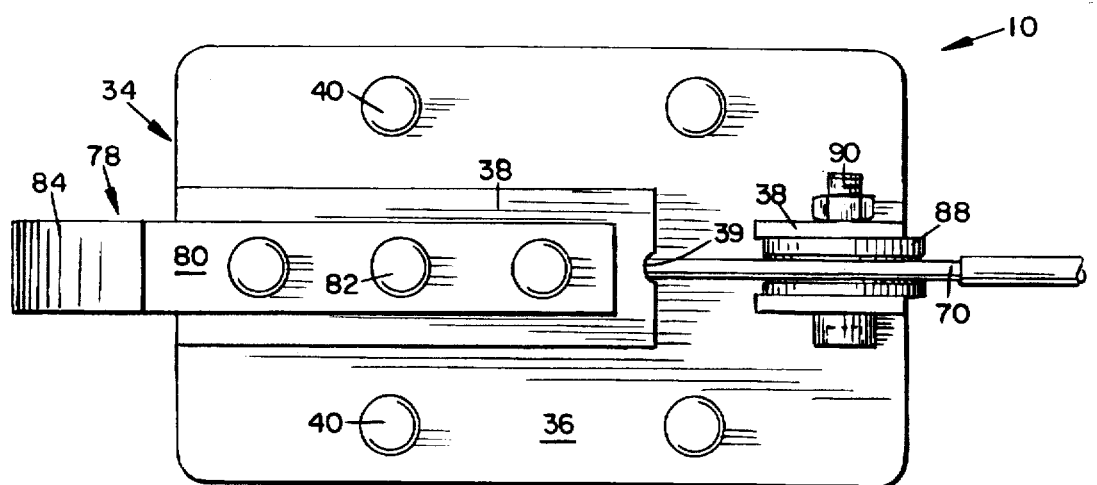
FIG. 4.
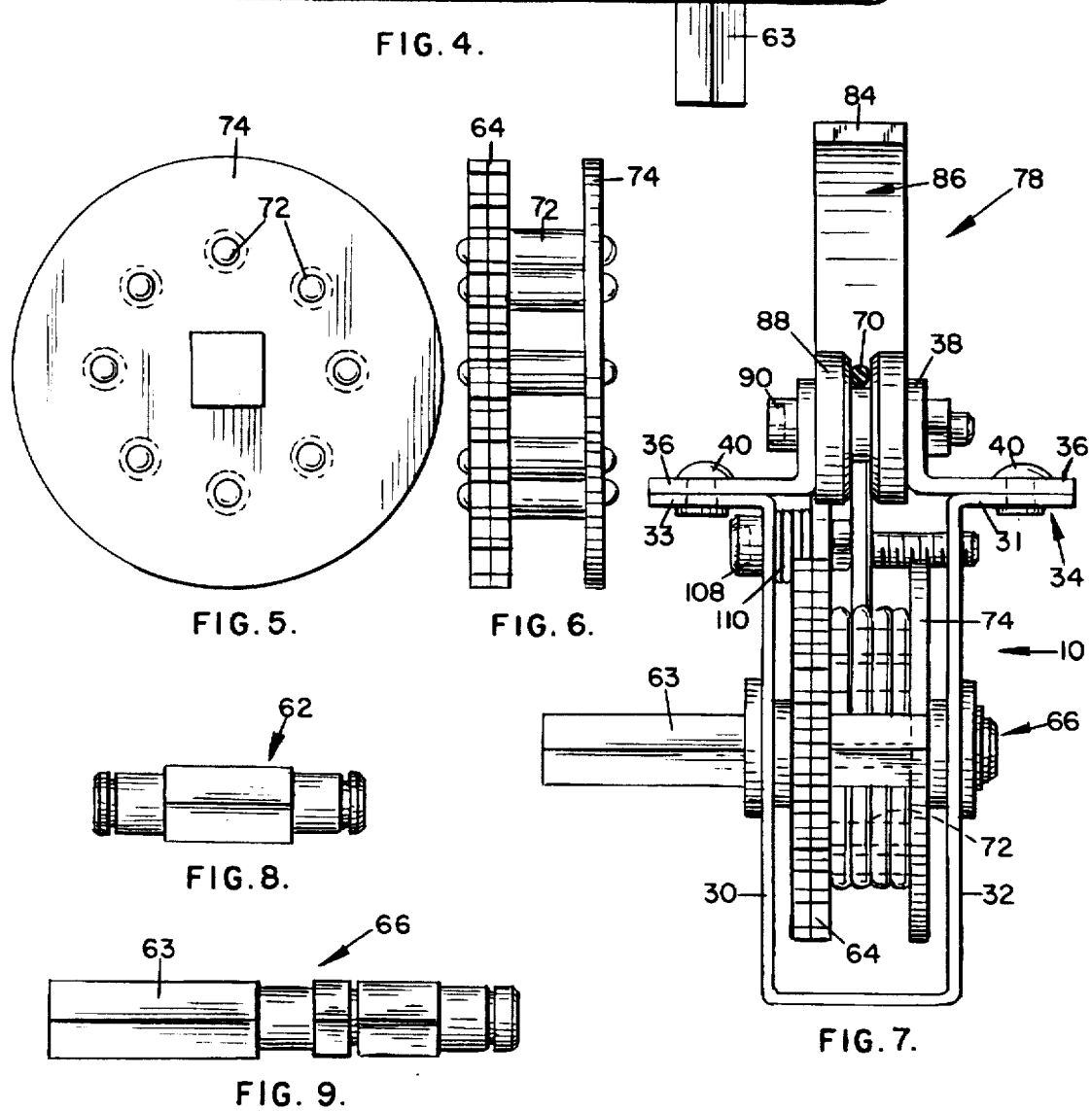
FIG. 5. FIG. 6. FIG. 7.
FIG. 8.
FIG. 9.

ROLLER TYPE CHAIN ASSEMBLING AND DISASSEMBLING MECHANISM

BACKGROUND OF THE INVENTION

1. Field of the Invention

The mechanism of this invention provides a manually operable tool for use on roller type chain and is designed to simplify the disassembly or assembly of roller chain by temporarily holding the chain in situ while links or pins are removed or added. Roller chains accommodated by such a tool envision drive chains for motor vehicles or bicycles, motor driven tools, and the like.

2. Description of the Related Art

The following patents have been found prior to the filing of the application for this patent and include:

| | |
|---|---|
| #1,994,270 of Mar. 12, 1935 | Cetrano |
| 2,332,607 of Oct. 26, 1943 | Schroeder et al |
| 2,382,447 of Aug. 14, 1945 | Schaeufele |

None of these anticipate the idea of a tensioning cable driven by a ratcheted gear train useful in connection with holding opposing sections of the chain in tension whilst an intermediate section therebetween is undergoing repair.

SUMMARY OF THE INVENTION

The invention provides a simple, easy-to-use, hand-held, manually-operated device for use in connection with the work of removing and/or inserting pins or link plates for a roller chain. Ideally, the device envisions use on size #80 through #240 roller chain of the single strand or multiple strand type.

It comprehends a gear box or housing defining a top wall or cradle for supporting a segment of a roller chain whilst undergoing repair.

A pair of crooks have portions engaged with the chain on opposite sides of the section of linkage to be repaired while the chain is tensioned. A first crook is fixed or stationary as to the mechanism and provides a primary force transmitting bearing point. A second crook is movable as to the mechanism and provides a secondary force transmitting bearing point.

A ratcheted gear train allows the maximizing of the torque and the holding of the chain by the ratchet means while the repair work ensues. When the repair work is completed, the tension is released through the ratchet, the tool is disengaged from the work, and the chain is removed from the mechanism.

The holding system hereof temporarily supports and immobilizes the chain during pin removal or insertion, thereby reducing the risk of any deformation of any of the chain components.

It will be understood, of course, that separate means will be employed in the repair work which comprehends positively forcing a pin into or from the roller chain.

BRIEF DESCRIPTION OF THE DRAWINGS

FIG. 4 is a view in top plan of the FIG. 1 device with the chain omitted;

FIG. 5 is a rear elevational view of the large gear and drum assembly of the invention;

FIG. 6 is an end elevational view of the large gear and drum assembly as seen from the left of FIG. 5;

FIG. 7 is an end elevational view taken on line 7—7 of FIG. 1, with the chain omitted;

FIG. 8 is a side elevational view of the large gear and drum shaft of the invention; and FIG. 9 is a side elevational view of the small shaft of the invention.

DESCRIPTION OF THE PREFERRED EMBODIMENT

Figure 1:
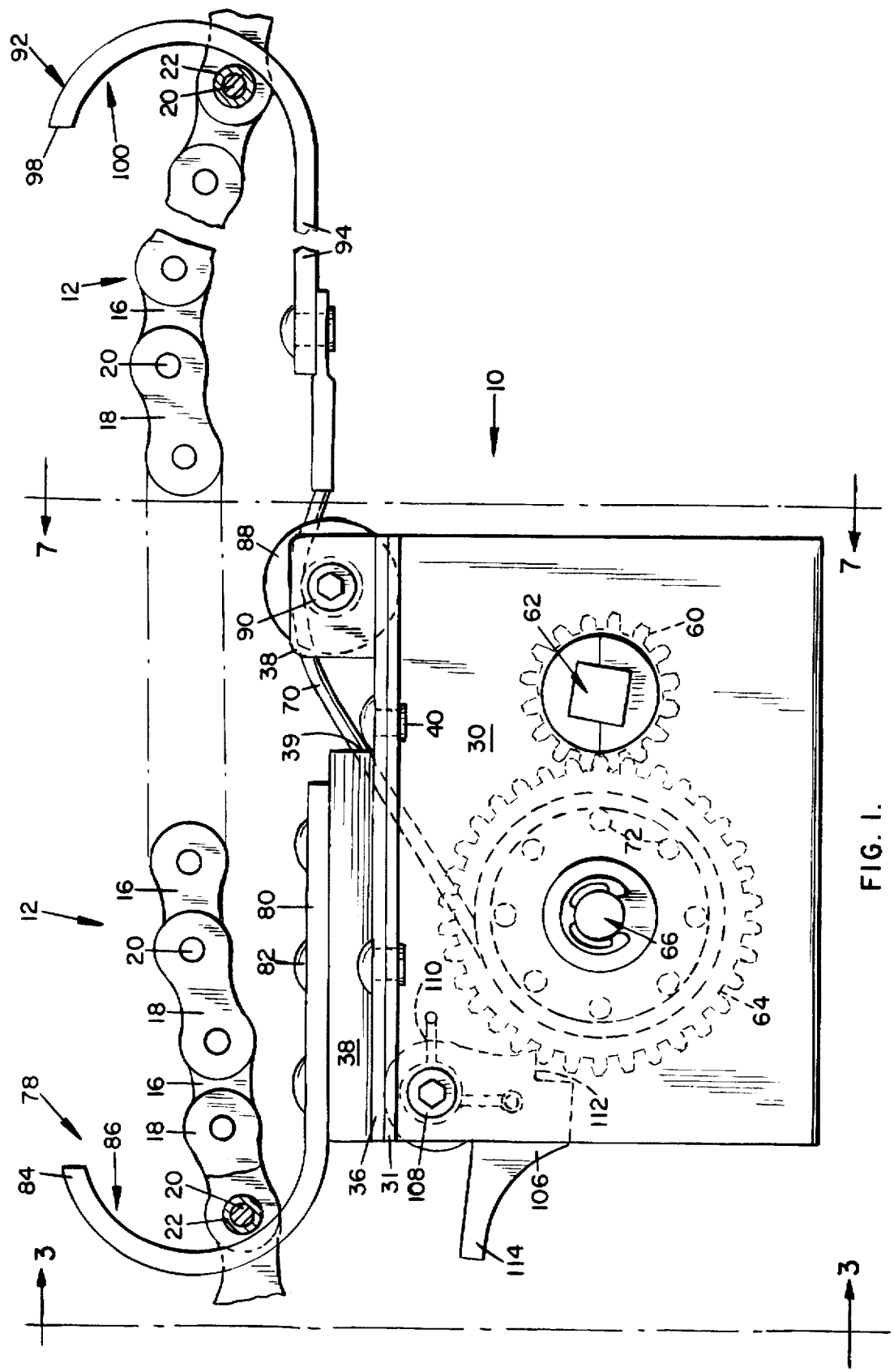
FIG. 1 is a view in front elevation of the device of the invention.

In FIG. 1, there is shown a preferred embodiment of a mechanism 10 supporting upwardly a conventional roller chain 12 during any assembling or disassembling work.

Roller chain 12 is comprised of a plurality of spaced cylindrical rollers 22 having bores along their axes, a plurality of spaced inner link plates 16, a plurality of spaced outer link plates 18, and a plurality of pins 20 connecting the chain components together.

Rollers 22 are arranged collinearly with their axes parallel to one another and perpendicular to the chain length.

Within the axial bore of each roller 22 is a cylindrical bushing, not shown, having a narrow bore or pin opening along its cylindrical axis which is in close tolerance with the diameter of an accommodated pin 20. Each pin fits tightly within the narrow bore of each bushing so that the pin is immobile with respect to its bushing.

The inner surface of roller 22 slides around the outer surface of its accommodated bushing 22 to allow the roller to rotate about the bushing.

Inner link plates 16, in combination with pins 20, fit the rollers into adjacent pairs which are translationally immobile with respect to one another, while outer link plates 18, in combination with the pins 20, fit the pairs of rollers together and permit the rotation of one pair of rollers with respect to an adjacent pair of rollers.

Mechanism 10 defines, in side elevation, a substantially rectangular block type configuration as a gear-accommodating housing with vertical, spaced, opposing walls 30 and 32 defining the sides of the housing.

A top wall 34, comprised of a pair of outboard wings 36, in spaced parallel relationship as to each other, includes a raised intermediate wall 38. Each wing 36 is secured by bolting 40 to a horizontally-extending complemental flange 31, 33 integral with and extending outboard of the top of a respective side wall 30, 32.

A gear train, located between the side walls, is comprised of a small spur or pinion gear 60 serving as the driver and mounted and held fast on a spur gear shaft 62 journalled in the side walls and, in mesh therewith, a large gear or ratchet wheel 64 serving as the driven gear and mounted on a gear shaft 66 likewise journalled in the side walls. A trunnion 63 extends from spur gear shaft 62 outboard of side wall 30.

Shafts 62 and 66 are disposed in spaced parallelism as to each other so that motion from spur gear 60 is transmitted to ratchet wheel 64, the two gears having mating teeth in their peripheries so that the one turns the other without slippage, the teeth being parallel to the axes of rotation and being sized in order to mesh properly, the spur gear having 16 teeth and the ratchet wheel having 34 teeth whereby a torque multiplier is advantageously obtained.

The faces of the teeth of the ratchet wheel against which the pawl bears are so formed that the pawl will not tend to fly out of mesh when a load is applied.

To prevent such disengagement, the teeth are inclined so that a line at right angles to the face of a tooth in contact with the pawl will pass between the center of the ratchet wheel and the pawl pivot.

A spring-loaded locking lever 106 is pivotally mounted on a pivot bolt 108 extendable through side wall 30 and a spring 110 circumscribes the pivot bolt for the selective engaging and disengaging of a forwardly-extending self-locking pawl 112 of the locking lever with the teeth of ratchet wheel 64. A finger-engaging portion 114 of locking lever 106 extends rearwardly outboard of the leftward housing end, as viewed in FIG. 1, and serves as themeans for operating the locking lever and releasing the pawl from its locking engagement with the ratchet wheel.

Pawl 112 is spring loaded by virtue of spring 110 and operates in the free-running direction much as an overrunning clutch, and prevents rotary movement of the ratchet gear once the desired tensioning is attained and freedome from movement of the chain is attained, as will be seen.

The intermittent movement is obtained by means of the ratchet gearing. In simple form, it consists of the ratchet wheel, the pawl, and the locking lever to which the pawl is attached.

When the ratchet wheel is rotated in a counter-clockwise direction, the pawl engages in seriatim the teeth of the ratchet wheel, the pawl simply lifting and sliding over the points of the teeth according to the ratchet wheel rotation. When the load is determined to be sustained by the ratchet gearing, the pawl is locked into position to preclude any backward rotation of the ratchet wheel.

A tension cable 70 is wound around and fixed at one end to one of a plurality of circumferentially-spaced pins 72 perpendicularly mounted upon an annular backing plate 74 (see FIG. 5), the pins connecting the backing plate to ratchet wheel 64 thereby defining in effect an annular drum around which cable 70 is secured at one terminus to one of the pins, from which the cable may be tangentially run out for a slackening purpose or in for a tensioning purpose.

Gear 60 is rotated by means of a wrench engaged upon the trunnion 35 disposed outboard of housing side wall 30 and by which means tension cable 70 may be payed out or retracted.

Figures 2, 3:
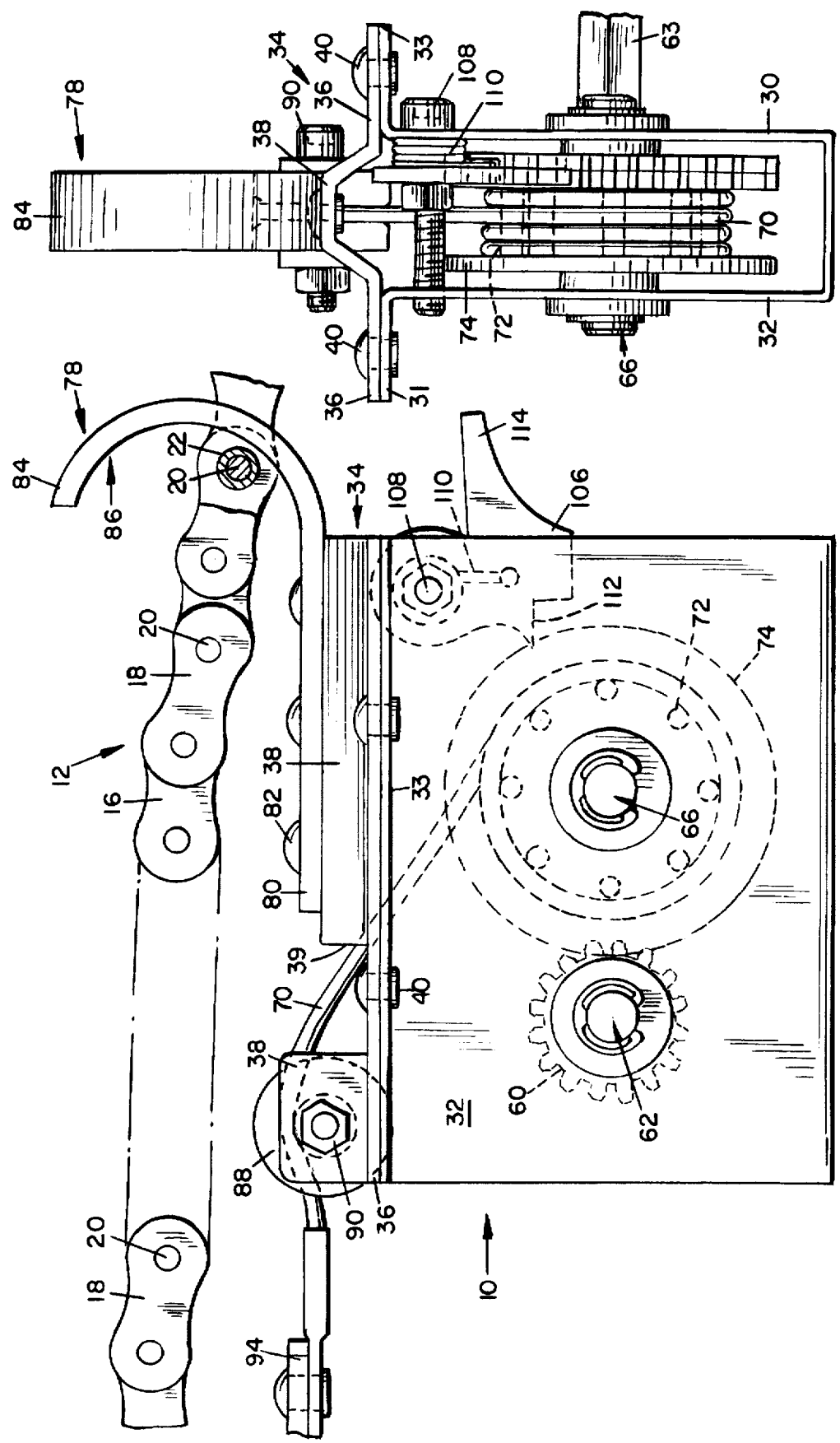
FIG. 2 is a view in rear elevation of the FIG. 1 device.
FIG. 3 is a view in end elevation taken on line 3—3 of FIG. 1, with the chain omitted.

A first chain engaging crook 78, shown leftware in FIG. 1 and rightward in FIG. 2, has a longitudinally-extending portion 80 fixed to intermediate wall 38 by bolting 82 and has, at its leftward or outboard end, an upwardly curved finger extremity 84 defining at its inner or facing side an arcuate curved bearing surface 86 which preferentially will conform to the roller curvature with which it will be frictionally engaged.

First crook 78 is fixed or stationary as to the mechanism and the finger provides a primary force transmitting bearing point as the finger bears against a roller.

The opposite free terminus of cable 70 is extendable outwardly through an opening 39 in intermediate wall 38 and passed over a grooved wheel 88 rotatably supported between spaced integral flanges or support arms 89 extending upwardly from the top wall wings, and journalled upon a wheel axle 90 extendable laterally through aligned central openings in the opposite flanges 80 and the hub of wheel 88.

The free terminus of cable 70 has an end cap 92 fixed thereto, to the outer extremity of which end cap a longitudinally-extending portion 94 of a movable second crook 92 is pivotally mounted by means of a pivot pin 96. Crook 92 has at its rightward or outboard end an arcuate upwardly-curved finger 98 defining at its inner or facing side a curved surface 100 which will generally conform to the roller curvature with which it will be frictionally engaged.

Second crook 92 is movable as to the mechanism and provides a secondary force transmitting bearing point.

Crooks 78 and 89 will be seen to be oppositely facing mirror images of one another, with their fingers preferably being tapered so as to facilitate the placement of each crook into engagement with a selected chain link, as shown in FIG. 1, with the concave side of each finger being engaged with the remote side of a selected roller.

The spur gear is rotated so that the movable crook is forced toward the stationary crook until the desired relaxing of the intervening chain links has been obtained.

Gear rotation places tension onthe chain on either side of the crooks while allowing the links between the crooks to be relieved of tension wherefor the individual links therebetween are thus advantageously positioned for the repair work contemplated.

By this arrangement of rotatable drum and linearly moving tension cable, there is provided a means for converting a ratcheted rotary intermittent motion into a rectilinear movement whereby the movable crook is pulled toward the stationary crook until the desired tensioning is attained.

Thus we have described a mechanism for immobilizing and temporarily clamping roller chain in situ while links are connected or disconnected with the insertion or removal of pins by the exploitation of discrete, laterally-spaced longitudinal forces. The fixed first crook with its arcuate bearing finger bears against the curved surface of a first selected chain roller and the oppositely-facing movable second crook with its arcuate bearing finger bears against the curved surface of a second selected chain roller.

A first force is exerted in one direction on the selected first roller and a simultaneously equal force is exerted in an opposite direction on a longitudinally-spaced selected second roller, thereby relaxing the intervening chain links disposed therebetween, the selected first and second rollers being drawn together by the application of the equal but opposite forces.

I claim:

1. A tool for drawing opposing first and second sections of an immobilized roller chain toward each other for enabling the repair of the intermediate chain section therebetween comprising:

a housing, a gear train within the housing and inclusive of a drive spur gear meshable with a driven ratchet gear, a trunnion extendable outwardly from the spur gear for manually effecting movement of the gear train, a spring-loaded pawl intermittently bearable against the faces of the teeth of the ratchet gear for locking the ratchet gear in a load position, a tensioning cable having one terminus fixed to the ratchet gear and movable therewith, a movable crook having an upstanding chain-engaging arcuate finger for frictionally engaging the surface of one of the rollers of a second section of the chain and being tethered to the opposite terminus of the tensioning cable, a stationary crook fixed to the housing and having an upstanding chain-engaging arcuate finger for frictionally engaging the surface of one of the rollers of a first section of the chain, whereby as the finger of the movable second crook is moved toward the finger of the opposite stationary crook a tensioning of the first and second sections of the chain develops while effectively relaxing the section of the chain between the fingers.

* * * * *